US008099334B1

(12) United States Patent
Stockwell

(10) Patent No.: US 8,099,334 B1
(45) Date of Patent: Jan. 17, 2012

(54) METHOD FOR MUSIC MANAGEMENT IN A MULTI-USER MUSIC SYSTEM

(76) Inventor: David Elbridge Stockwell, Houston, TX (US)

( * ) Notice: Subject to any disclaimer, the term of this patent is extended or adjusted under 35 U.S.C. 154(b) by 190 days.

(21) Appl. No.: 12/717,673

(22) Filed: Mar. 4, 2010

Related U.S. Application Data

(60) Provisional application No. 61/157,219, filed on Mar. 4, 2009.

(51) Int. Cl.
G06Q 30/00 (2006.01)
(52) U.S. Cl. ...................................................... 705/26.1
(58) Field of Classification Search .................. 705/26.1
See application file for complete search history.

(56) References Cited

U.S. PATENT DOCUMENTS

| 7,216,178 | B2* | 5/2007 | Juszkiewicz | 709/231 |
|---|---|---|---|---|
| 2003/0195851 | A1* | 10/2003 | Ong | 705/50 |
| 2005/0197725 | A1* | 9/2005 | Alexander et al. | 700/94 |
| 2006/0089914 | A1* | 4/2006 | Shiel et al. | 705/52 |
| 2007/0067243 | A1* | 3/2007 | Malik | 705/59 |
| 2007/0271338 | A1* | 11/2007 | Anschutz | 709/204 |
| 2008/0046372 | A1* | 2/2008 | Lutnick et al. | 705/51 |
| 2009/0165080 | A1* | 6/2009 | Fahn et al. | 726/1 |

OTHER PUBLICATIONS

Alves, "The Rise and Fall of Digital Music Distribution Services" University of Wollongong, Research Online 2005.*

* cited by examiner

Primary Examiner — Yogesh C Garg
Assistant Examiner — Matthew Zimmerman

(57) ABSTRACT

The Invention is a network-based system for the playing, enjoyment, and management of music and other electronic media which is easy to use by means of simple remote control devices assigned to each user.

Each user votes for/against each track as it is played, and those preferences are stored to shape future playlists, while identifying each user's favorites.

Because the remote control associated with a player has a unique address, it can connect to any music player. The system identifies the user and downloads his favorite tracks, adding them to the mix of music played.

When multiple users are present the invention plays music selected from the media of all of them. They may buy copies of tracks from each other, yet firm control of the distribution of tracks is maintained ensuring protection of artist copyrights and enabling timely, accurate payment to distributors and copyright owners.

7 Claims, 15 Drawing Sheets

Title
Multi-User Music System with Individually-Assigned Remote Controls
Inventor
David E. Stockwell, Houston, TX (US)
Drawings
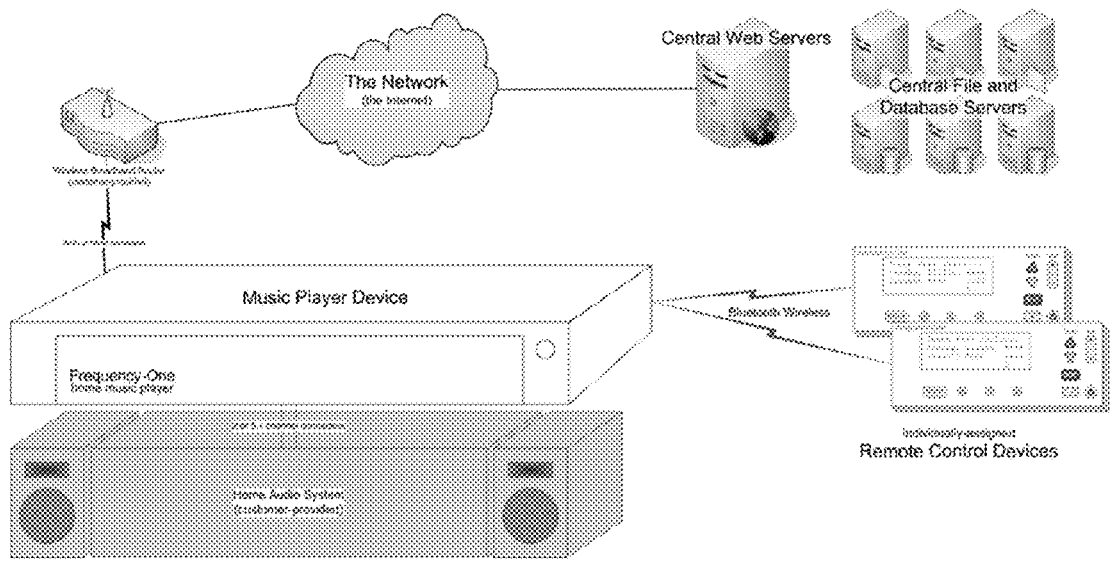
Figure 1: Multi-User Music System Overview

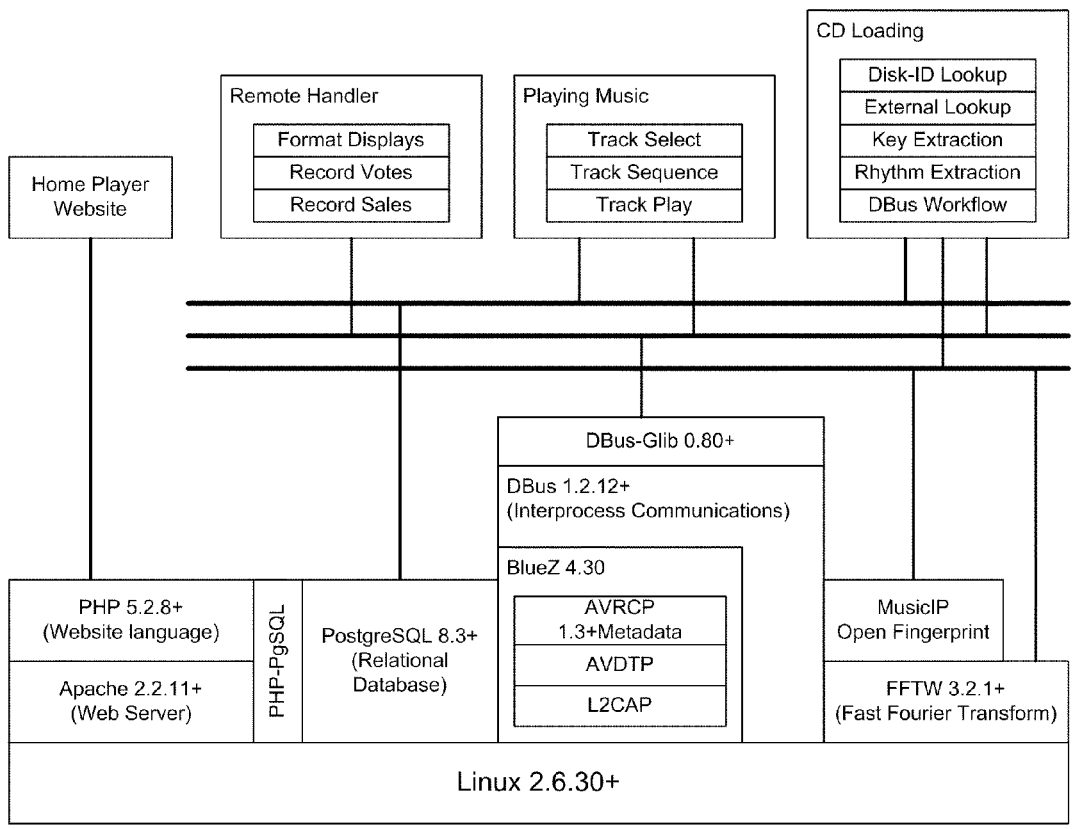
Figure 2: Music Playing Device Software Architecture

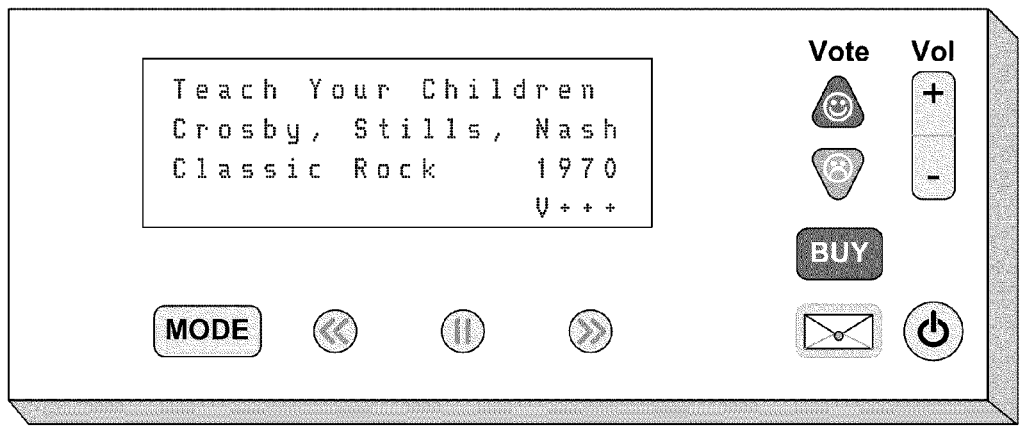
Figure 3: Remote Control Device (Current Embodiment)
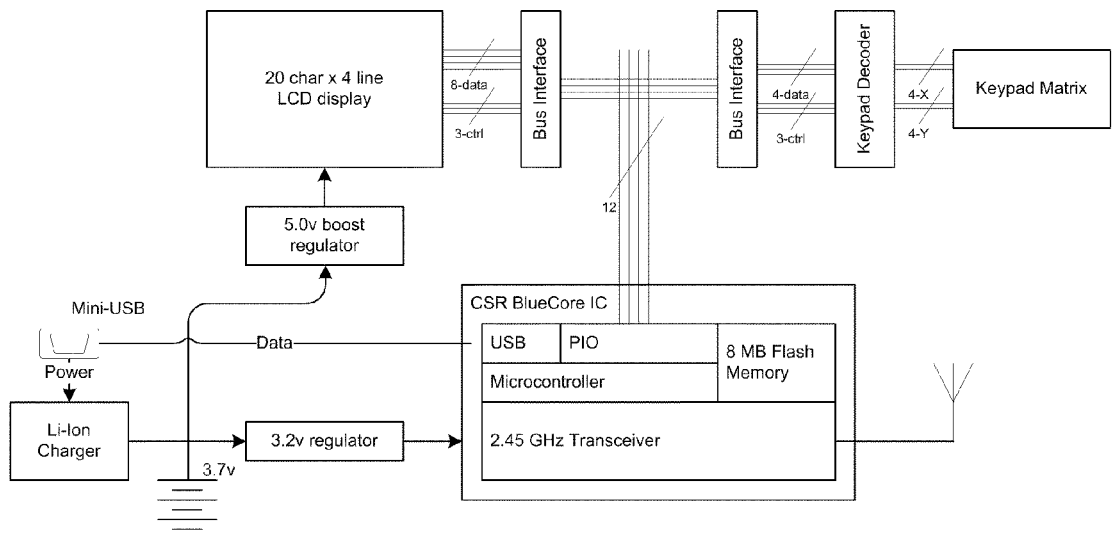
Figure 4: Remote Control Device Schematic (Current Embodiment)

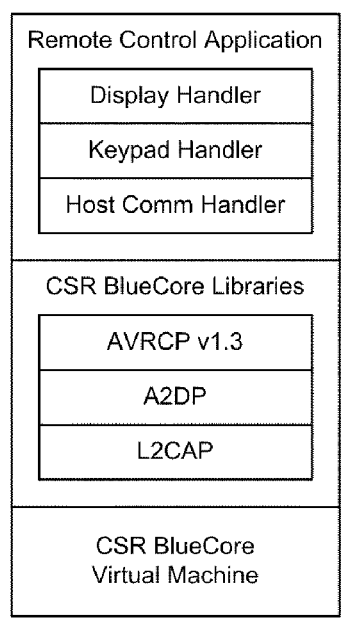
Figure 5: Remote Control Device, Software Elements (Current Embodiment)

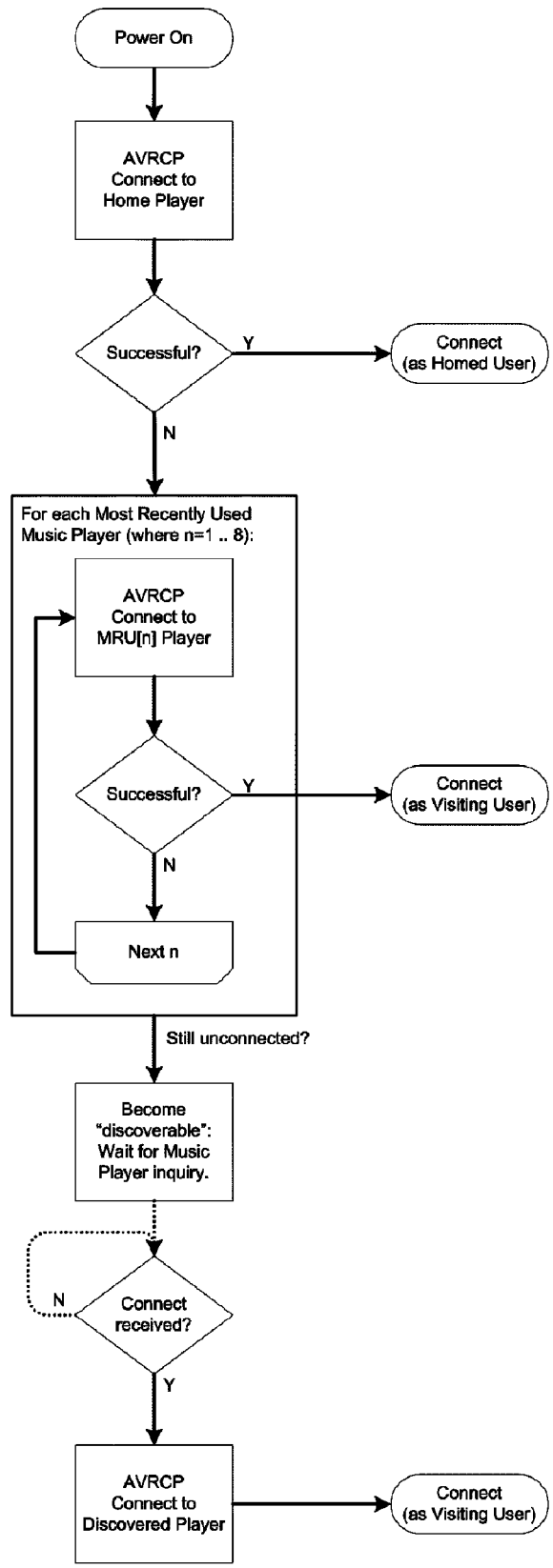
Figure 6: Remote Control Device Sign-in Process (Executed in Remote Control Device)

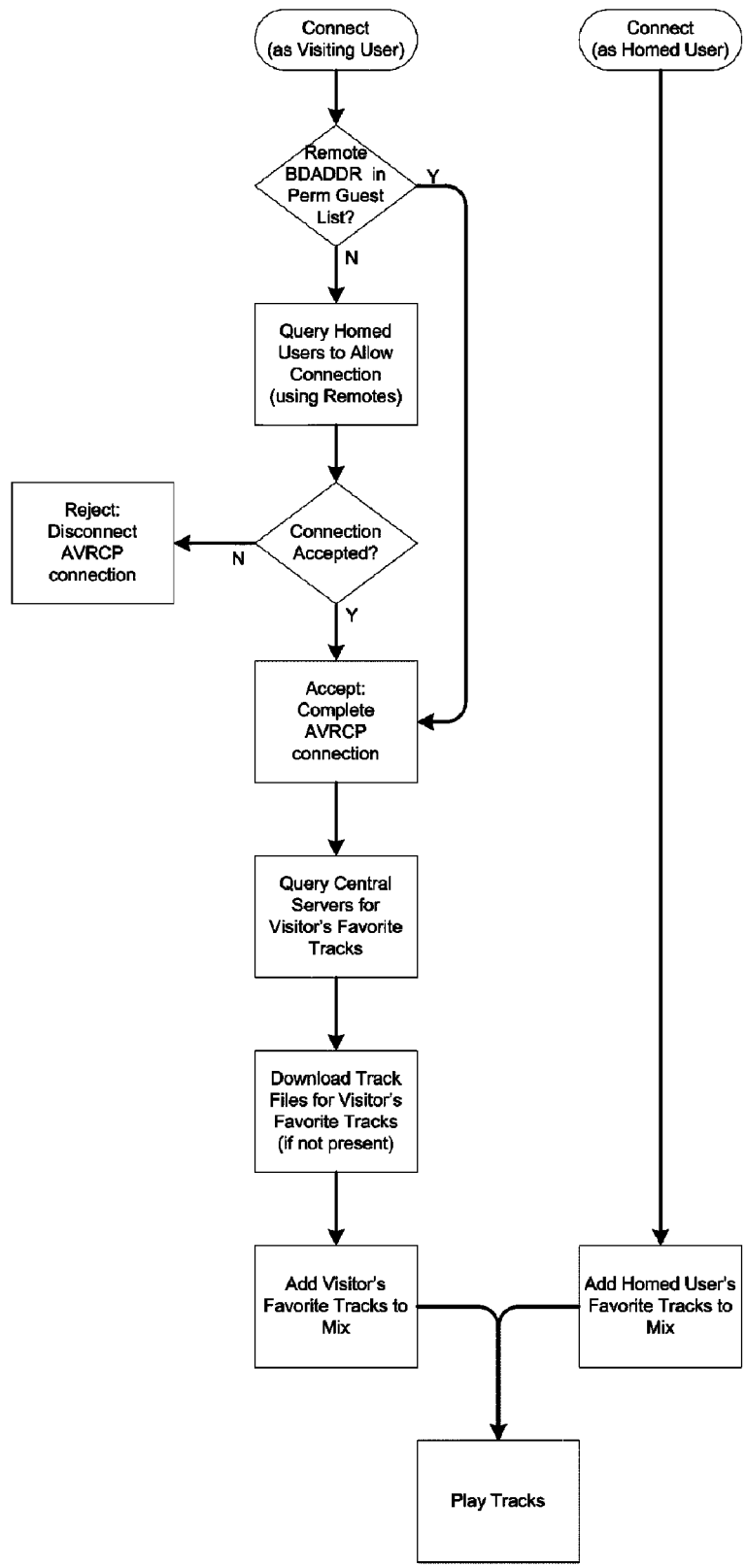
Figure 7: Remote Control Device Sign-in Process (Executed in Music Player Device)

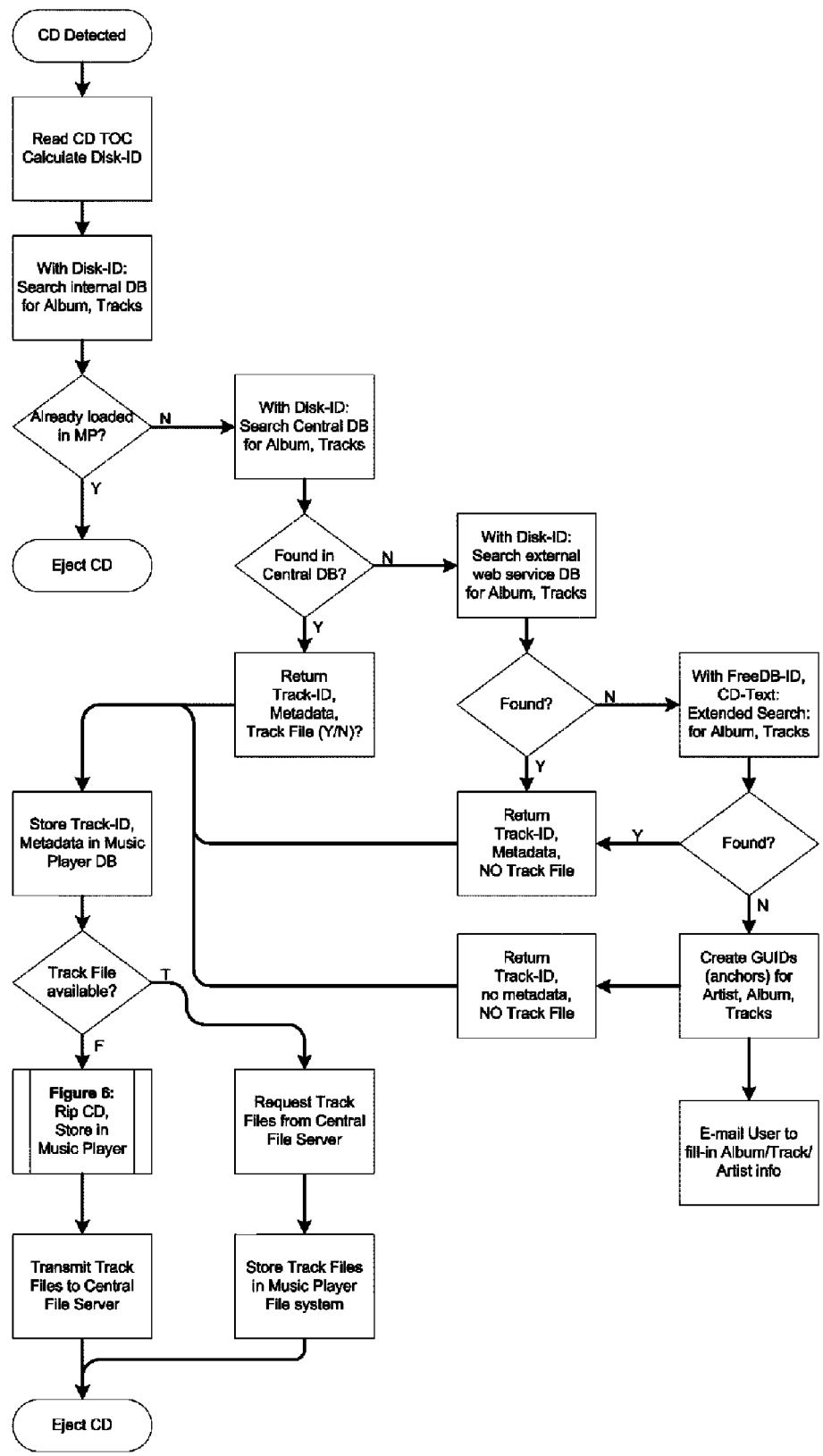
Figure 8: Flow Diagram: Process for Loading CDs

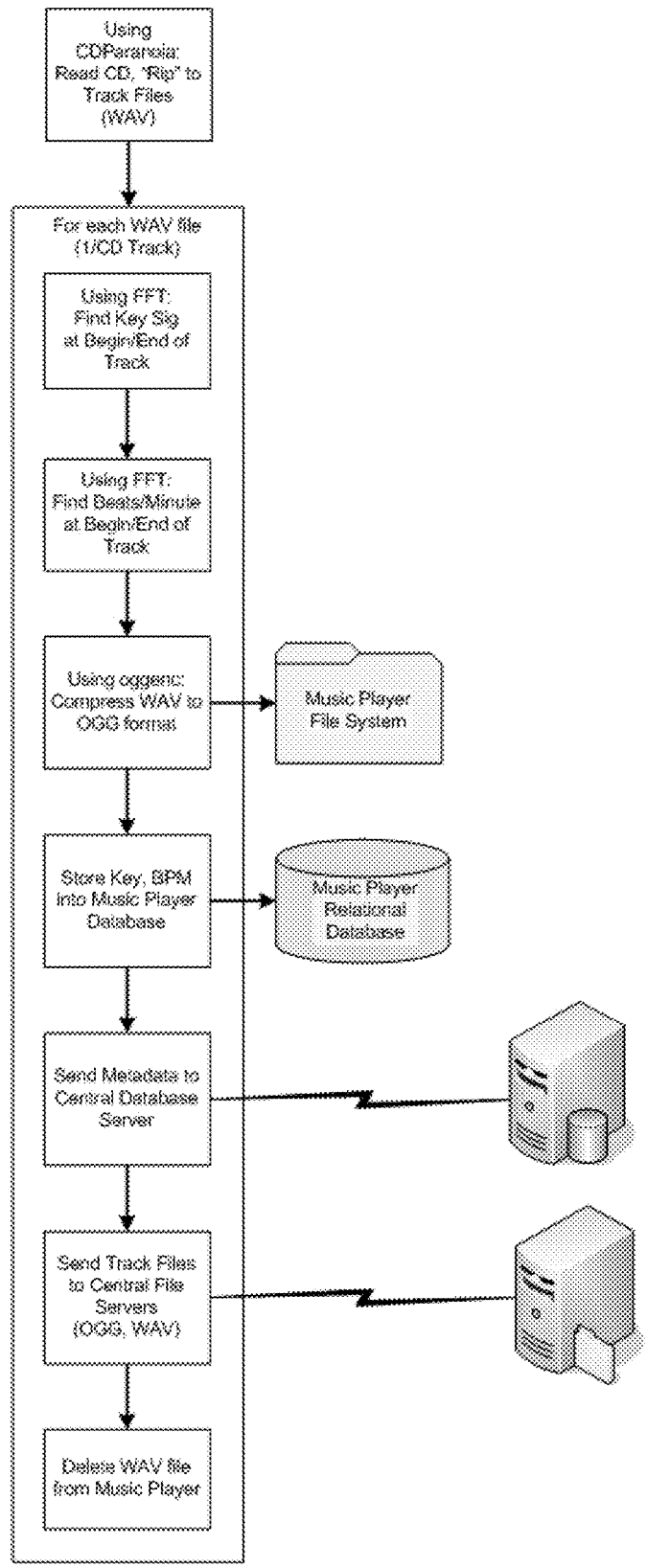
Figure 9: Flow Diagram: Process for "Ripping" CDs

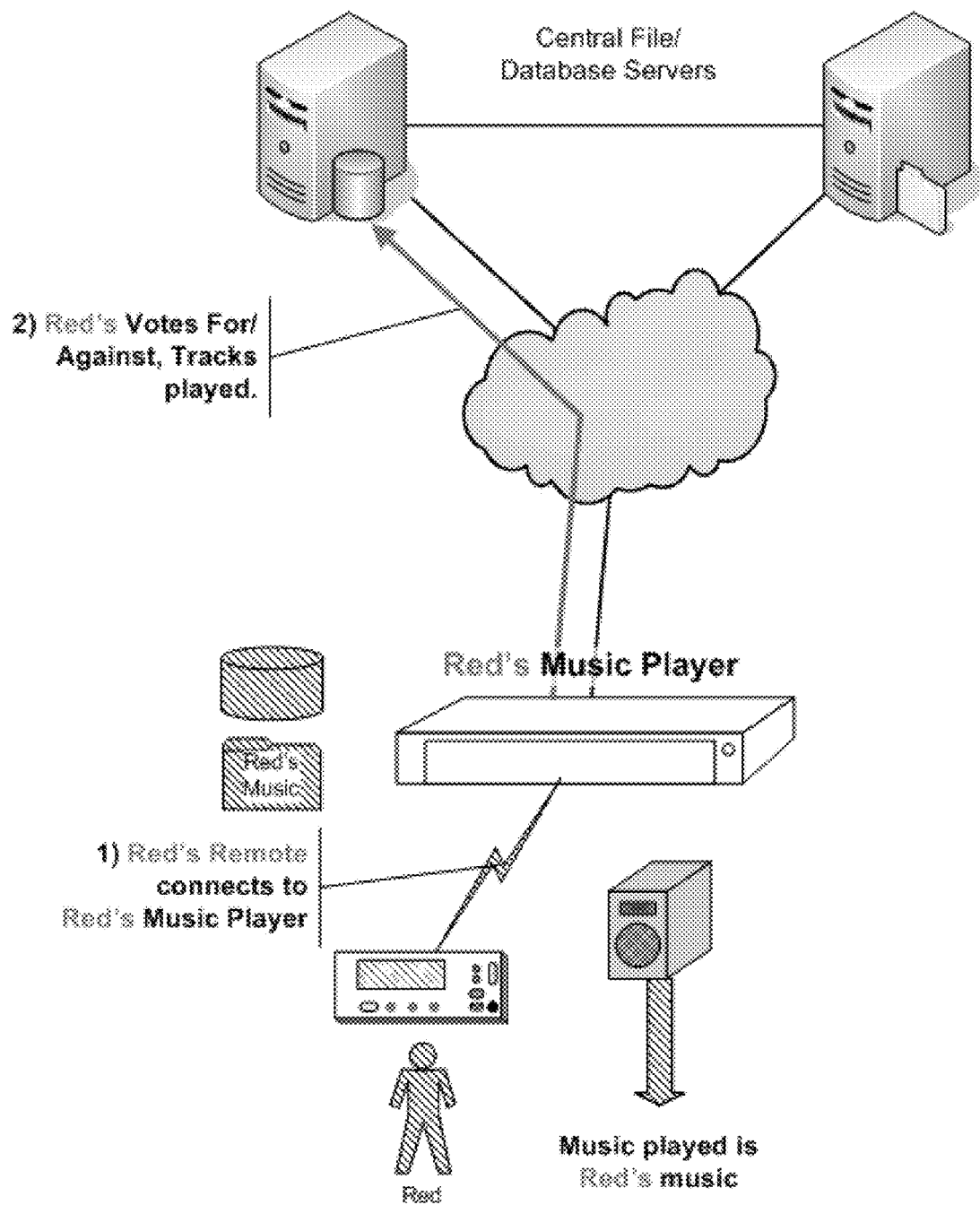
Figure 10: One User (Red), Listening at Home Music Player

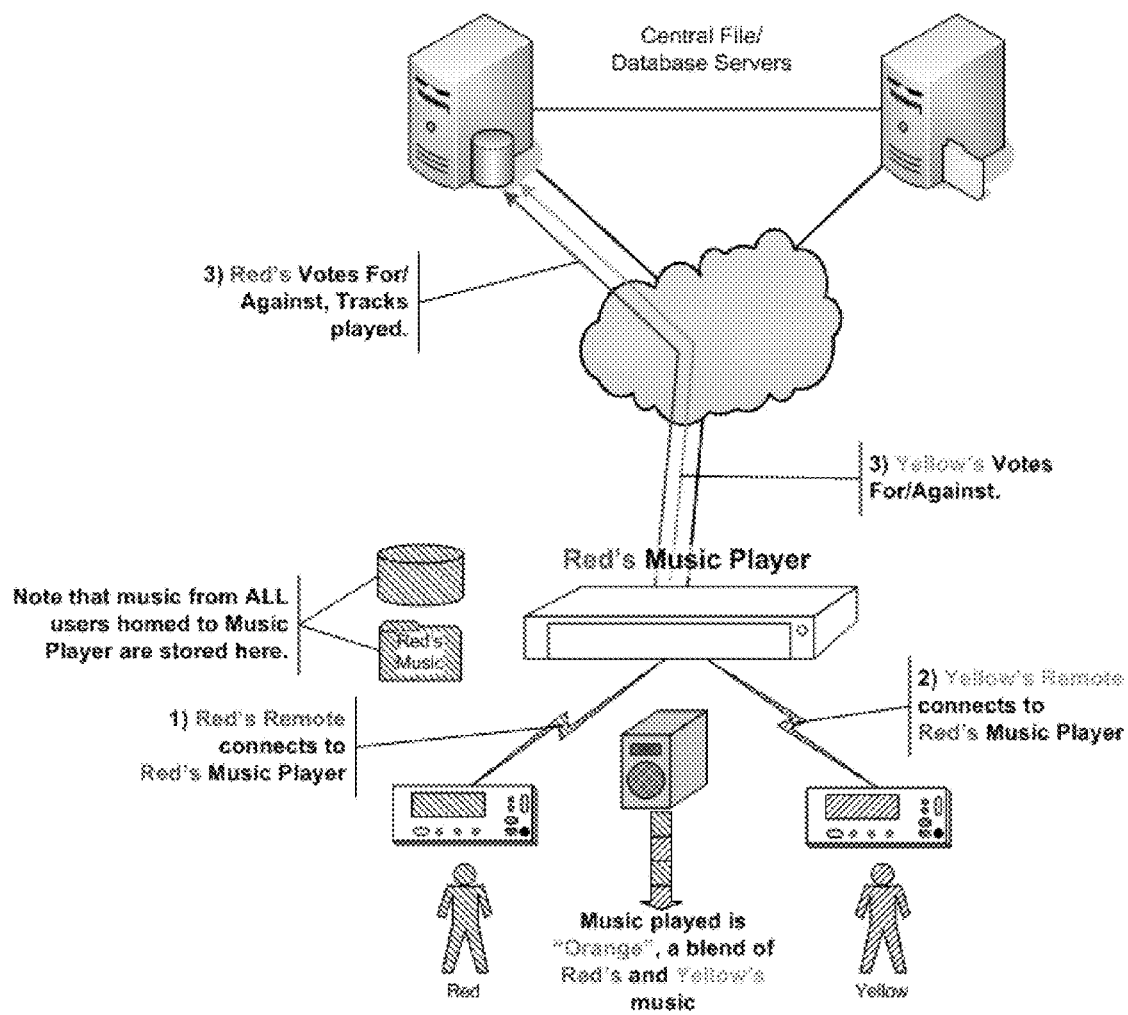
Figure 11: Multiple Users (Red and Yellow), Listening at Home Music Player

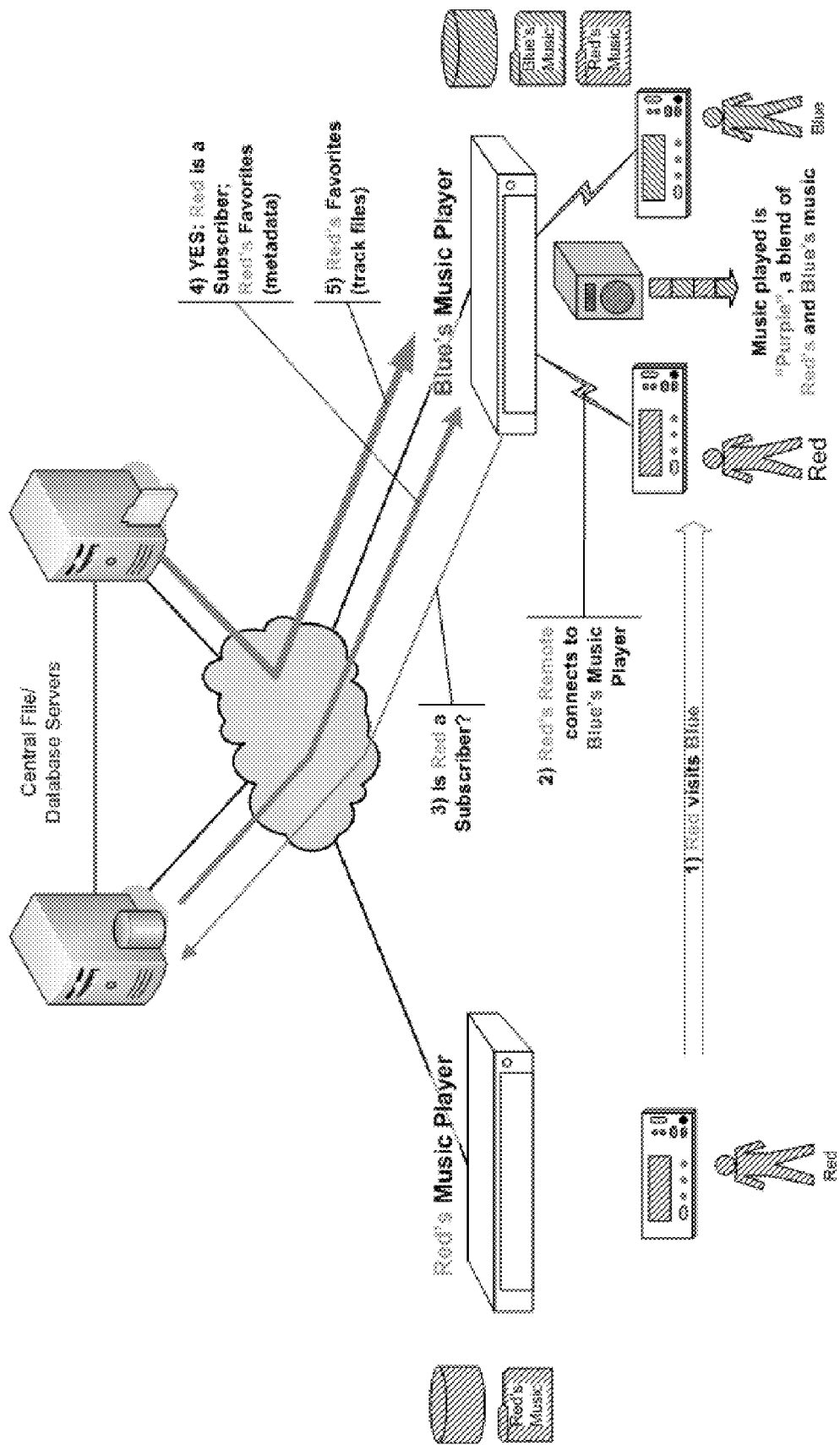

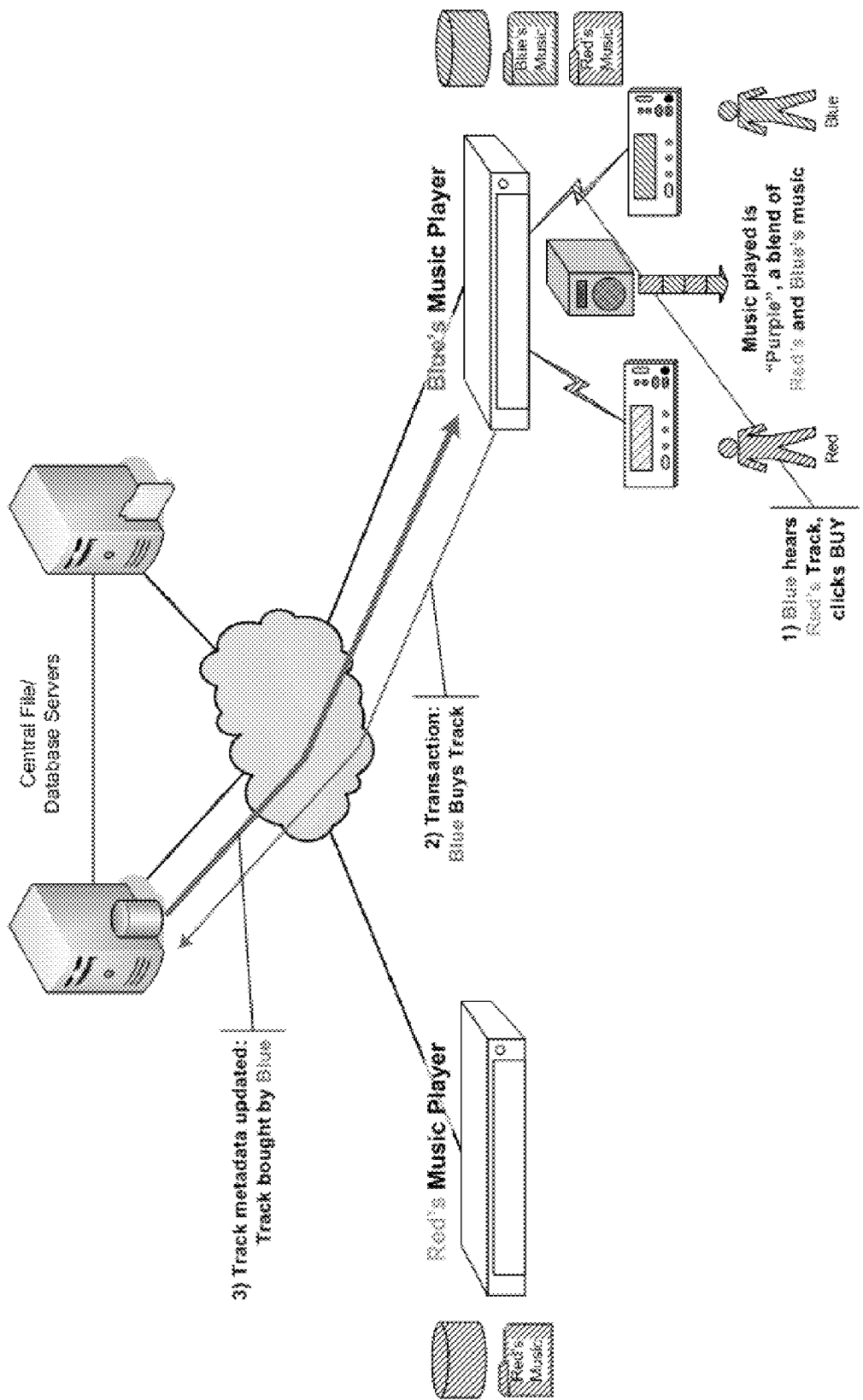
Figure 13: Blue Buys one of Red's Tracks at Blue's Home Music Player

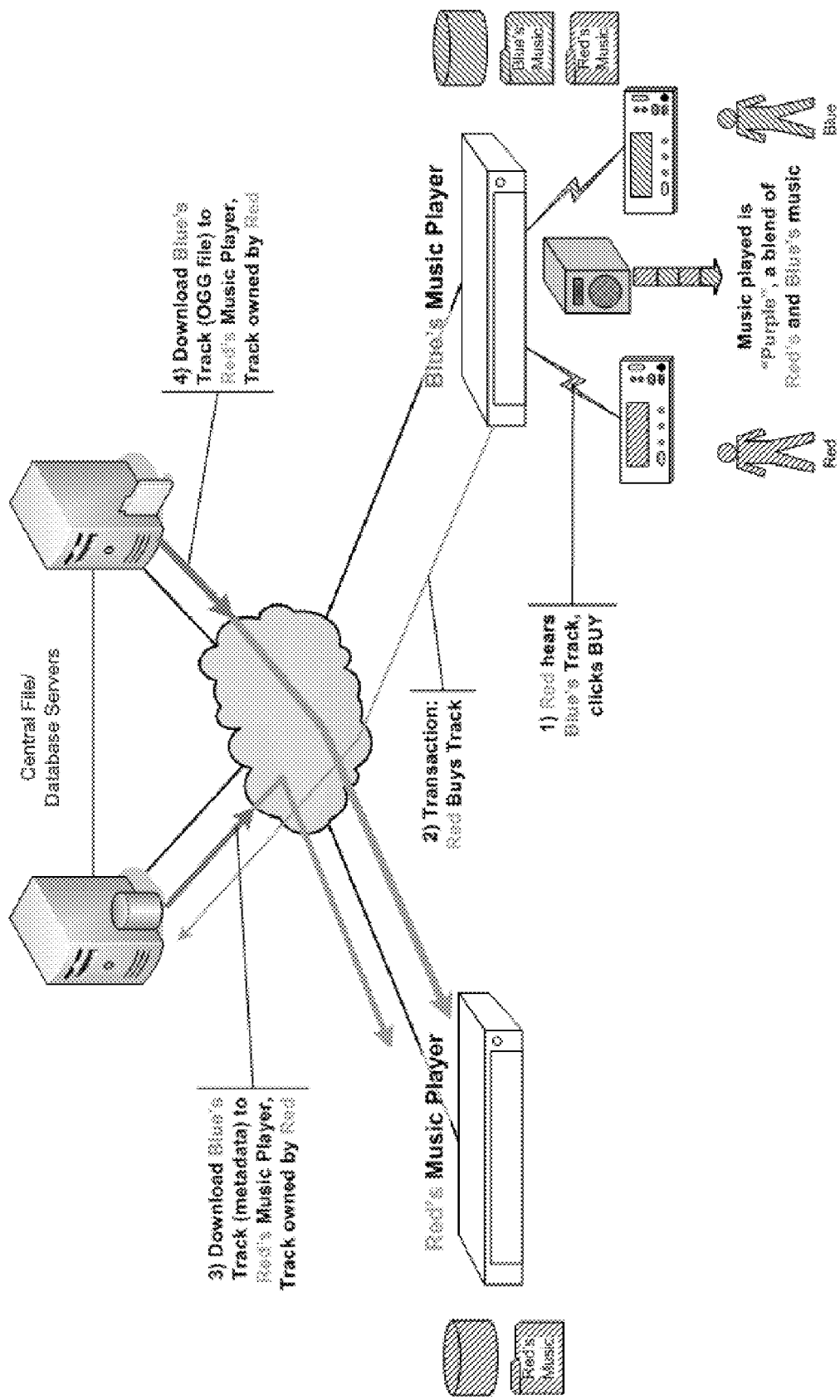
Figure 14: Red Buys one of Blue's Tracks at Blue's Home Music Player

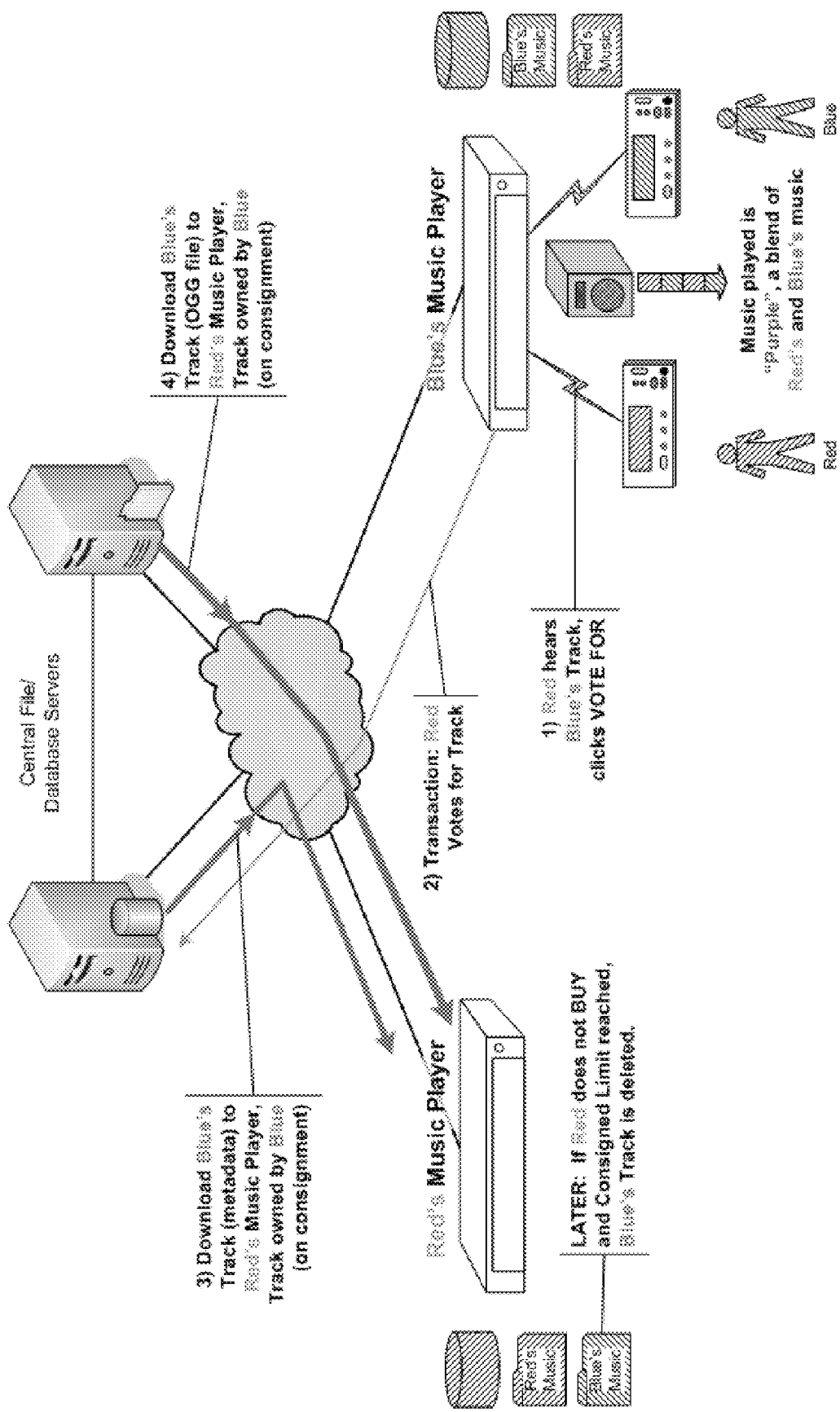
Figure 15: Red "Votes For" one of Blue's Tracks at Blue's Home Music Player

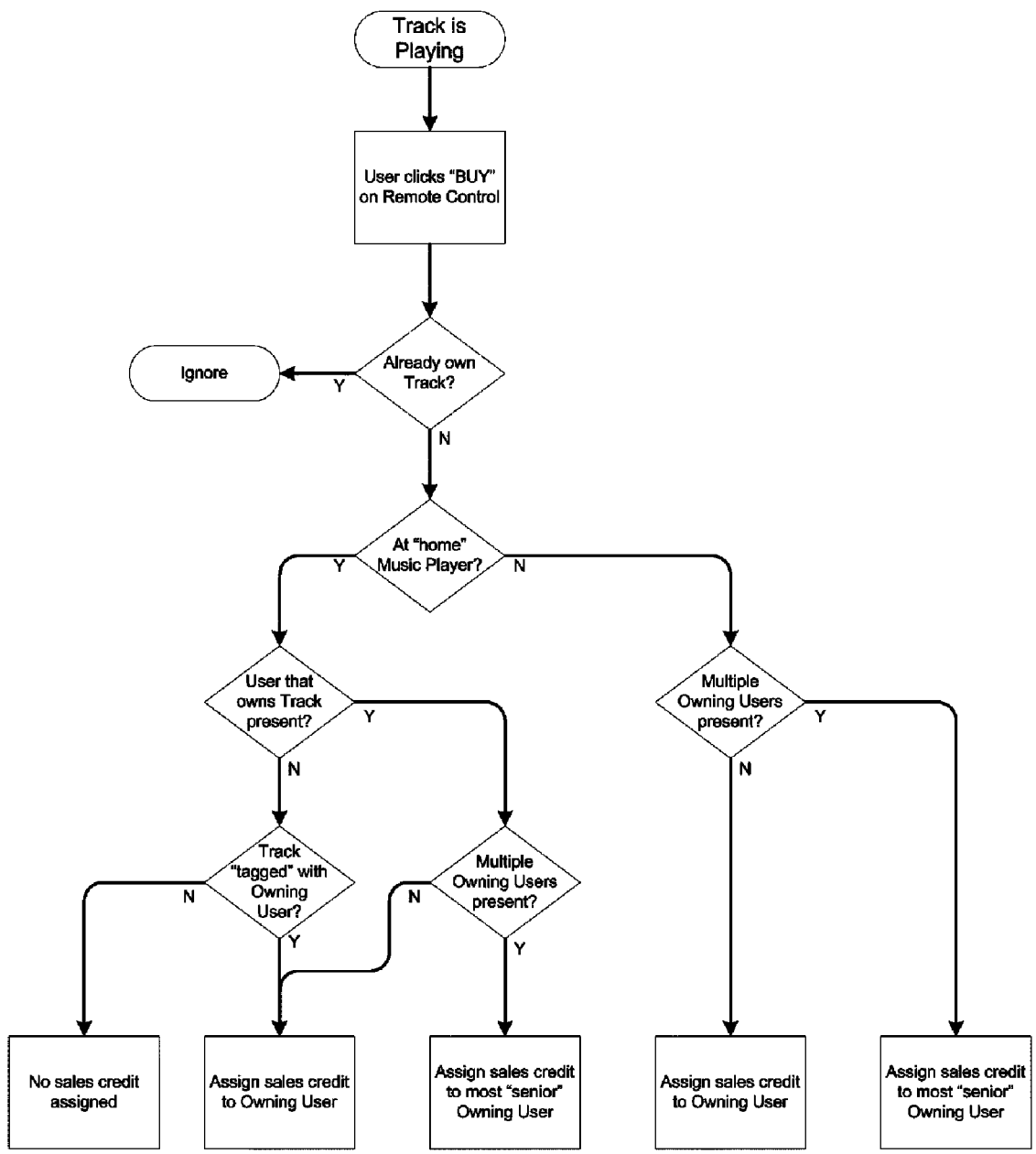
Figure 16: Assigning Credit for User-Promoted Track Sales

METHOD FOR MUSIC MANAGEMENT IN A MULTI-USER MUSIC SYSTEM

CROSS-REFERENCE TO RELATED APPLICATIONS

This application claims the benefit of PPA Ser. No. 61/157,219, filed 2009-03-04 by the present inventor, which is incorporated by reference.

FEDERALLY SPONSORED RESEARCH AND DEVELOPMENT

None.

BACKGROUND OF THE INVENTION

CD Players and Changers

The initial idea for the design and implementation of this system arose from having accumulated several hundred CDs, and the frustration of having only a small portion of this collection available at one time in a fifty-CD changer (jukebox). This frustration was compounded by the fundamental limitation of CD changers in that virtually all changers play CDs sequentially; they provide no way to favor certain favorite tracks over others, nor do they provide any way to skip tracks that may be particularly disliked.

Listening to a CD takes about an hour as the CD player plays each track in sequence from beginning to end. As a result, once a group of preferred CDs is found, even if there are a few tracks on each CD that one would rather skip, one tends to listen to a sequence of CDs over and over again, effectively limiting the selection of music to that subset of eight to ten CDs.

Another limitation of CD changers is that one often hears a track and would like to know the name of the song, who played it, or in which year it was released. Some CDs are encoded with album name, track title, and artist using the CD-Text format, but many CD players have no way to display it. As a result most CD publishers do not bother to encode their CDs with CD-Text. Usually the only way to find out what is being played and who is playing it is to eject the CD and read the title off the CD. This is time-consuming and very disruptive to just enjoying the music; most listeners just do not bother.

Finally, CDs in a changer are not portable: to listen to some of the same CDs in the car or at a friend's house, one must eject them from the changer and carry them to the car or to the friend's home. This process is cumbersome and raises the possibility that the CDs may be lost or damaged in the process.

Personal Computer-Based Downloaded Music

During the early part of this decade, it became popular to download music from various file-sharing websites into personal computers, playing it from those systems. The most significant issue with this approach was that there was no control over how many copies were downloaded and the lack of any payment for copyrighted music.

After the most notorious "free" music download websites were shut down (after litigation by artists and music distributors), the websites that remain have adopted either a pay-per-track model, or a monthly fee model in which subscribers can download as much as they want for a set monthly fee. These sites are very popular and sell a lot of music tracks, and account for a significant portion of music industry revenue. That said, it is questionable that the monthly-fee business model generates a proper level of revenue for the music distributors or royalties for the artists.

The usability of these sites vary, but they all require their users to boot up and/or sign on to their systems, start their web browser, and navigate to a website. They then search for the music desired, download the tracks into their personal computer, organize them into "playlists", and (finally) play the music. The music tracks are stored in files on the user's hard drive and go wherever the computer goes: if a laptop, the music is portable. However, whether stored on a desktop or a laptop the user must back up the hard drive frequently, or the music collection will be a total loss when the hard drive fails.

While there are a lot of technically-oriented people that enjoy signing on, downloading, etc., etc., there is a larger number of people for which even a bit of "technical rigmarole" is confusing and unacceptable.

Computer-Loaded Portable Players

Portable players are generally an extension of downloaded music, mentioned above. While Portable Players include MP3 players, music-capable cell phones, and various other gadgets, the most prominent solution of downloaded music and portable players is Apple's integrated iTunes/iPod combination. Microsoft also released a somewhat less popular combination of Windows Media and the MP3/WMA-based Zune.

Portable players are very popular, and the iPod (and its MP3-based cousins) have become ubiquitous. Their primary disadvantage is that only one person can listen to a portable player at a time; listening to one's iPod or MP3 player is not a shared experience. In fact, piping music directly into one's ears tends to be an isolating experience, and it is not uncommon to see couples listening to their iPods, not speaking, while listening to entirely different music.

To address this social deficiency, a number of manufacturers are selling "docks" for these portable music players. Users can place their iPod/MP3 player in a cradle, connecting it to an external audio amplifier and speakers instead of playing through the usual ear-bud headset. However, this still means that the music everybody listens to is the music of the person that downloaded it and put it into playlists loaded into that one iPod/MP3 player. No allowance for the differing musical tastes of other listeners is possible.

High-End Music Player Systems

A number of manufacturers have developed high-end systems for playing music. Usually these systems are a bit pricey, focused on high-income customers with relatively new homes that include media rooms, built-in wiring, built-in control panels in the rooms, and the like. These include:

The Olive music player, which is a computer-like "box" that can be added to a customer's music system. The main functions of this system are to allow a user to load his/her own CDs into the device, and then play them through the customer's existing music system. The device provides an Internet connection enabling the system to identify each CD as it is loaded, checking against the Gracenote database to identify album, artist and track information. The system also provides the ability to display album covers on a small display.

The Olive music player includes a remote control allowing up to two users (one at a time) to vote for/against tracks that are liked or disliked. For more than one user to vote, the user must locate the remote, switch to his/her setting, and cast the vote.

Although we can assume that one remote would work with another Olive music player, it is not clear that the Olive can handle more than one remote at a time (one switched for the votes of one user, and one for another), nor what the effect of multiple remotes on an Olive would be.

The Bose Lifestyle system is a more complete system than the Olive, including not only a music player, but a high quality amplifier and small (but excellent) wall-mountable cube speakers as well. This system also has an Internet connection, enabling the system to identify each CD as it is loaded. Interestingly, the system also functions as a CD and DVD player, so that album covers and artwork may be displayed on an attached television set (not included).

Like the Olive music player, the Bose Lifestyle system also includes a remote control, but this one allows up to ten users (one at a time) to vote for/against tracks that are liked or disliked. For more than one user to vote, each user must locate the remote, switch to his/her setting, and cast the vote.

Many of us understand how difficult it can be to share a remote and can imagine how having more than a couple of users sharing a single remote to cast votes could be difficult: it is likely that most votes would never be cast because it would not be seen as worth the bother.

As with the Olive, it is also not clear that the Bose Lifestyle system can handle more than one remote at a time, nor what the effect of multiple remotes on the Bose Lifestyle system would be.

Patent US 2005/0197725 (issued Sep. 8, 2005) describes a system and process allowing users to play up to two streams of media to up to two locations. The described system focuses on a relatively high-end system with a touch screen that allows users to create playlists for themselves. Much of the patent document describes the process for loading and tagging tracks with descriptive metadata. Another area discussed in detail is the process of cross-fading between tracks, a standard practice of broadcast engineers and disc jockeys.

There is no discussion of Remote Controls; apparently they are not relevant, or all system control is performed through the touch screen.

U.S. Pat. No. 7,216,178 B2 (issued May 8, 2007) describes a broad collection of concepts, methods, and hardware to implement a fully-controlled means for playing and distributing music. A core aspect of the described invention assigns unique identifiers to proprietary music-playing devices, commercial off-the-shelf and proprietary software, and PDA-based remote controlling units. Another aspect embeds "unique identifiers" into musical track files so that any "unauthorized" copies can be traced back to the person creating the copy. The patent goes on to briefly describe some scheme for labeling music downloaded to a proprietary playing device with yet another unique identifier. Yet another aspect discusses distribution and display of music and program guides, television program guides, and so on.

The issued patent seems overly broad, yet does not describe any aspect of the system—except possibly the selection of now obsolete PC-class hardware components—to any level of detail such that anyone "skilled in the art" could reproduce the system. The described invention also requires that every aspect of the invention be based on configurations of proprietary hardware/software, and that every transaction at every level of the invention take place between authorized individuals, and using authorized, proprietary hardware and software.

In contrast, the only proprietary hardware element of the Invention described herein is the uniquely-identified Remote Control, which serves to identify authorized Users as described in the following sections. All other hardware is non-proprietary; the proprietary value of the Invention is contained in the software running the System(s) and Service, and the Service itself.

Remote Controls for Music Systems

Most remote controls for televisions, music players, audio systems, and similar devices and systems use a modulated infrared LED to transmit commands and information between the remote control and the devices addressed. The standard protocol for communications between remote and the controlled devices is defined by IEEE-1394.

More recently, a Bluetooth-based profile (a protocol layer), the Audio-Visual Remote Control Profile (AVRCP) protocol, has been defined for communications between a Bluetooth-based remote control and its controlled devices by the Bluetooth Special Interest Group (SIG). However, few, if any, commercial Bluetooth devices supporting the AVRCP profile have been reduced to practice and put into production in any scale.

U.S. Pat. No. 6,781,063 (issued Mar. 22, 2005) describes a method for controlling access to a computer system using a short-range wireless device, such as a mobile telephone, connecting to a computer system. User authentication is generated by use of a Subscriber Identity Module (SIM card) in the mobile telephone, which is uniquely identified to the user, usually by his/her mobile telephone service provider.

Patent US 2005/0278547 (issued Dec. 15, 2005) describes a method for establishing an identity using a personal short-range wireless device, such as a cellular telephone or other device. The described invention is not specific to using Bluetooth protocol, allows use of infrared and other wireless transmission means. What is key here is that the device itself is not sufficient for establishing identity; the user must still validate his/her identity by providing a password or some other token to validate his/her identity.

In direct contrast, the Remote Control Device described by this Application, uses the Bluetooth protocol and the AVRCP profile. However, this Invention goes further, in that all addresses of authorized Remote Control Devices are known to the Service, and these authorized Remote Control Devices are individually issued and assigned to its Subscribing Users. Thus, the Service and System embodied in this Invention is able to use the unique address of the Bluetooth device itself as sufficient to establish the identity and presence of the Subscribing User as it connects to any Subscriber's Music Playing Device, at any point in the network worldwide.

SUMMARY OF THE INVENTION

The described network-based media system is comprised of the following components:

1. An in-home Music Playing Device, also referred to as the "Music Player", based on standard personal computer-class hardware and an open-source operating system. A user's music collection is stored in the file system, one file per track. Software is included to automatically select, sequence, and play the music, and to capture votes cast by each individual user present for or against each track, transmitting those votes to the central database. Software is provided that automatically extracts music files from the user's owned CD collection and stores those files in the file system, querying a central database about the tracks extracted to store that information locally in the music player in a database maintained within the music player.

While based on a standard low-end PC architecture, the music player does not include a display screen, a mouse, or a keyboard. The user interface is provided through the remote controls (described, following). In addition, the music player incorporates an internal web server accessible via a web browser from any regular personal computer connected to the in-home network, enabling access to certain extended information and control functions.

The music player does not include an audio amplifier or speakers; those are provided by the owner of the music player. They may be as simple as powered speakers (as might be added to a desktop computer) or as complex as a high-end music system.

The music player should have a high-speed network connection, either wired or wireless. While the music player will operate without this connection, including when the connection may be temporarily offline, full functionality requires Internet connectivity to Central Database and File Servers using standard Internet protocols, including http, https, web services, and others.

2. One or more uniquely-addressed and uniquely-identified Remote Control Devices (FIG. 3), with one Remote Control Device assigned to each Subscribing User (also referred to as simply, User). The Remote Control communicates with the Music Player using the RF-based Bluetooth protocol and the AVRCP profile, displaying information about the currently-playing Track and transmitting votes for or against the playing Track from the listeners to the Music Player.

This Remote Control is a key element of the system in that the system/service tracks the unique Bluetooth address of each Remote Control and to whom the Remote Control is assigned. No further information, no SIM card, no password is required to indicate who is listening to the service at each Music Player: the presence of the Remote Control with its unique Bluetooth address is enough to establish the presence of the User.

3. One or more Central Server Clusters, each of which will include one or more Central Database Servers for the Music Database, and one or more Central File Servers for Music Track Files.

The Central Database Servers contain information about all Tracks stored on the system, albums they relate to, artists who performed them, plus information about the Users of the system, including voting records for and against various Tracks, Track ownership, purchases and sales.

The Central File Servers store the Tracks owned by any or all Users of the music system/Service. When more than one User owns a given Track, only one copy is maintained. Similarly, when exact copies of a given Track exist on more than one CD, only one copy is maintained.

The servers may be implemented in multiples running concurrently for load sharing, and may also be geographically distributed to distribute network traffic. When more than one server instance exists, content of all servers shall be maintained in synchronization with each other.

4. A secured Central Website, hosted on one or more clustered Web Servers, providing controlled access to the central servers and the services and information they provide.

SUMMARY

The Inventor believes that by providing easy-to-use mechanisms for playing the music and, to an extent, restricting user choice in what tracks are played and in what sequence, the described system will not only provide for greater ease of access and enjoyment of the Subscriber's music, but will also minimize opportunities and motivation for gathering and creating illicit copies of music tracks contained in the system.

REFERENCED DRAWINGS

FIG. 1 is an overview of the multiple user music system, showing the relationship between the home Music Playing Devices, uniquely-identified Remote Control Devices, the user's home audio system, and, via an Internet connection, the central website, file and database servers on which the Service is hosted.

FIG. 2 diagrams the application and system-level software running in the home Music Player, including its embedded relational database, the internal website, and the open source Bluetooth software, plus other supporting system software.

FIG. 3 is a sketch of the Bluetooth-based Remote Control Device. As stated before, there shall be one Remote Control assigned to each user of the system/service, uniquely identifying each user to the system.

FIG. 4 is a high-level schematic of the current embodiment of the Remote Control Device, including the LCD display, the keypad, power control, and a commercial off-the-shelf Bluetooth transceiver circuit with built-in microcontroller.

FIG. 5 diagrams the software/firmware running on the Remote Control Device, including both off-the-shelf software libraries and components provided by the vendor of the Bluetooth transceiver and the application elements programmed by the inventor.

FIG. 6 is a flowchart of the process followed within the Remote Control as it signs on to a nearby Music Playing Device. As shown, the Remote Control first attempts to connect to the Music Playing Device to which it is "homed". However, if that Music Playing Device is not available or does not respond, the Remote Control then attempts to connect with the most recently used (MRU) Music Playing Devices. Failing a connection with any of these, the Remote Control then enters a "discoverable" state waiting for any nearby Music Playing Device to establish a connection.

FIG. 7 is a flowchart of the "other" side of the Remote Control Device sign-on, that which executes in the Music Playing Device. If the person assigned the Remote Control is at home and connecting with his/her "homed" Music Playing Device, the process is relatively simple. On the other hand, if the person assigned the Remote Control Device is visiting another place, there may or may not be a need for permission to connect to the system through the Music Playing Device. Also, there may be a need for the visitor's music to be downloaded into the visited Music Playing Device, as shown in the flowchart.

FIG. 8 is a flowchart of the process programmed into the home Music Playing Device to load and identify a user's CD into the device.

FIG. 9 is a flowchart of a sub-process executed to extract tracks of music from each CD, identifying key signatures and rhythm for each track so that sequencing is more pleasing to the ear of the listeners.

FIG. 10 show the sequence of events and flow of music and data that takes place as an individual, with his/her Remote Control Device, signs into the Service via his/her home Music Player Device and listens to his/her own music.

FIG. 11 expands on the previous single-user sequence of events, showing that multiple Subscribing Users (each with his/her own Remote Control Devices) are able to sign into the Service via a single Music Playing Device. The resulting stream of music played includes Tracks that are favorites of each Subscribing User present.

FIG. 12 is yet another expansion on the previous two diagrams, showing that a Subscribing User may travel to the home of another Subscribing User of the Service. When he/she arrives, assuming he/she is carrying his/her Remote Control Device, the User is able to sign into the Service via the home Music Playing Device of another. Again as above, the resulting stream of music played is a mix of the favorite Tracks of each Subscribing User present.

FIG. 13 shows that when a visiting Subscribing User is present at one's home Music Playing Device, the Subscribing User owning that Music Playing Device may hear a track from the visiting User that he/she may want to purchase. This diagrams the transaction flow in which with a single click of the appropriate button on his/her Remote Control Device the Subscribing User owning the Music Player may buy a copy of the track.

FIG. 14 is similar to the previous (FIG. 13), except that the visiting Subscribing User would like to buy a Track that he/she hears away from home. With a single click of the BUY button on the Subscribing User's Remote Control Device, the visiting User may buy a copy of the Track, which is then downloaded (or queued for download) to the home Music Player of the visiting User.

FIG. 15 differs from the immediately previous diagram (FIG. 14) in that the visiting User indicates that he/she likes the Track he/she heard, but has not yet chosen to buy it. In that case, the Service downloads a copy of the track to the visiting User's home Music Player in the hope that the visiting User, once home, might decide to buy it. If the User later purchases the Track, a copy of the Track is sold to that User and an appropriate transaction is sent to the Central Server(s) to record the purchase. If not, after a set number of plays the track is deleted from his/her home Music Player.

FIG. 16 describes the process followed to assigning possible Sales Credit for sale of a Track to a User, using the "Buy" button on his/her Remote Control. The process also allows for tentative purchase using the "Vote For" button, in which the Track is consigned to the User (at his/her home Music Player) for a limited number of plays. The key point in either case is to determine the User (if any) who introduced the buying User to the track so that Sales Credit can be assigned to the "Selling" User, when the Purchase is actually consummated. When the Track is introduced to the buying User directly by the Service, or when the User selects tracks for download from the Service-provided website, there is no Selling User.

DETAILED DESCRIPTION OF THE INVENTION

The following discuss the core set of operations within the described multi-user music system, showing the interplay of subscribed users of the system/service with the remote control device, the music playing device, the network (essentially, the Internet), and the central website and servers.

FIGS. 9-10: Loading Music

On initial startup of the subscribing user's music playing device (hereinafter: "Music Player"), the user will be instructed to load his/her CD collection. It is anticipated that the user would start with his favorite CDs and progress on to less favored CDs. The order of loading will be seen by the system as an initial take on popularity in selecting tracks of music for play.

The process of loading a CD is designed to be simple, as diagrammed in FIG. 8. When the User slides a CD into a CD drive or attached to the Music Player, software in the Music Player detects the presence of the CD in the drive and reads the CD table of contents, computing a hash-based Disk-ID based on the length of the tracks (in blocks) and the offset of the first block of each track. This computed Disk-ID is then used to search the local Music Player to see if that CD, or another copy of the CD, is already loaded into the Music Player. If so, the CD is simply ejected and no further action is taken.

On the other hand, if the Disk-ID is not found on the local Music Player, a secure Web Services query is sent to the central servers via the central website, seeking whether that Disk-ID is found in the central servers, whether the album, artist, and track information is stored in the central database, and whether the music-containing files exist on the central servers.

If the Disk-ID is known to the central service, the response message back to the Music Player will contain the album, artist, and track information, and indicate whether or not the music track files are available in the central file servers. If the music track files are not available, the following "ripping" process is triggered (FIG. 9):

1. All of the Tracks are "ripped": extracted from the Red Book CD format to WAV files, one per Track. As each Track is extracted, any CD-Text on the disk (regarding track title and artist name) is also extracted and stored with the WAV files. After the end of this step, the CD is ejected.
2. A Fourier transform-based "fingerprint" is extracted from the first Track (only), for comparison with the central database to verify that the CD is correctly identified.
3. A process is executed to identify the musical characteristics of each Track at the beginning and end of each file. These include executing Fast Fourier Transforms (FFT) to analyze the frequency characteristics of the beginning and end of the Track to identify the key signature.
4. Another FFT-based process will determine the beat signature (beats per minute) at the beginning and end of each Track.
5. Yet another process will determine the length of the fade-in from the beginning, and the length and offset of the fade-out at the end. These musical characteristics assist in automatically blending Tracks when the Music Player plays it in sequence from one to the next.
6. The Track is compressed from the raw WAV file format (about 30 MB/track) into a high-quality highly-compressed format (the current embodiment uses OGG-Vorbis: about 2 MB/track). This file is stored and catalogued in the file system directory of the Music Player. Note that it is also possible to compress the WAV file into a less-compressed format (in the current embodiment, OGG_FLAC: about 15 MB/track), however these files will obviously take up more space on the Music Player's file system, and would take correspondingly more time to transmit to the Central Server.

7. The compressed file and the WAV file, along with the musical characteristics, are transmitted to the central server, which stores the characteristics of each Track in the central database, and the files in the central file server.
8. After transmitting the bulky, uncompressed WAV file to the central server, the Music Player deletes the uncompressed file from the file system of the Music Player.

On the other hand, if the music track files are available in the central file servers, the following process is triggered:

1. The CD is ejected.
2. The compressed files for all of the tracks, along with album, artist, track information and the musical characteristics, are downloaded from the central server and stored in the Music Player's file system and the internal database If the CD is not known to the service, the Disk-ID, the contents of the CD table of contents (CDTOC), any CD-Text, and the musical fingerprint of the first track will be used to search several external open source databases to identify the CD as closely as possible. If found only in the external sources, given that the CD was not known to the service, it is logical that the music track files will also be absent from the central servers, so a message is passed back to the Music Player requesting that the CD must be ripped as in FIG. 9 to extract the tracks to WAV and compressed files. These are then stored in the user's own Music Player as above, and transmitted to the central file and database servers.

If a matching CD is not found in the external sources, it is quite possible that the disk is long out-of-print, or is from an independent producer; any of a number of other possibilities that do not now come to mind could also apply. When this is the case, the service will send a request via e-mail to the User, asking the User to help by identifying the CD, the artist, and its tracks, entering them using a standard Internet Browser, updating the internal Music Player database via the internal website maintained within the Music Player. When the User updates the records corresponding to the CD in the internal Music Player database, those records will be transmitted to the central server. There, the information will be verified by the Service and, if they correspond to a legitimate CD, will be included into the central database.

When a CD is loaded into a Music Player, all Tracks loaded from that CD are deemed to be owned in common by all Users "homed" to that Music Player. There is no attempt to parse which Tracks from which CDs were loaded by which User. The key concept here is that Track ownership may be different from the set of favorite Tracks for each User.

Playing Music

The primary goal of any music system is to just play music for its listeners. While basic single-user listening—discussed in the next section—should be more-or-less obvious, the benefits of the Invention will become apparent as we get into the more complex and unique functional modes.

FIG. 10: One User, Alone at Own "Homed" Music Player

The first and primary mode discussed is that of one User listening to music on his/her Music Player, by him/herself. In this mode, and unlike most other systems in existence, the Music Player software selects tracks of music from its database according to a set of rules encoded in the software. The Music Player software selects tracks from (a) the User's expressed favorite Tracks, (b) Tracks in the Music Player, including old favorites, that the User has not heard from some time, (c) Tracks that the user heard and liked in another Music Player (more on this later), and (d) Tracks offered for sale from the Music Service.

After the Music Player selects a batch of music to be played, it sets that music into a candidate sequence based on the genre represented by each track (so that any leaps from genre to genre are not too jarring), the beginning and ending key signatures of each Track and its predecessor/successor (so that the musical transition from track to track is seamless, or at least musically pleasing), and the beat signatures of the tracks in sequence (so that again the musical transition from track-to-track is pleasing). It is not necessarily the case that this computed sequence will be followed exactly; it will constitute an internal "guideline" for the actual sequence of play which will follow.

Here it is important to note that unlike other systems, there is no requirement that the listener first boot up a system, log in, open a browser, sign into a website or other user interface, search for desired tracks, select them, put them in order as a playlist, or any other such effort prior to listening; all of this is handled by the Music Player software, based on previously-derived expressed preferences of each individual User, preferences expressed through votes entered using his/her Remote Control.

As each Track is played, the User's Remote Control will display the name of the Track, the Artist, and other information about the Track. The length and relative starting time of the Track is captured by the Remote Control so that when the User votes for or against the current track, not only the vote is captured, but the relative time-within-track is captured for submission. Votes are typically sent from Remote Control to the Music Player in real-time. Alternatively, they can be buffered for transmission at end-of-track, or in cases where the Remote Control goes out of range of the Music Player, when the connection is re-established.

When the Track is finished playing, the User's votes are aggregated in the Music Player and uploaded to the central server via the Internet connection. Votes are identified to the individual User so that the User's individual preferences are known to both the Music Player and to the central server.

FIG. 11: Additional Users at Own "Homed" Music Player

The number of Users that may sign on to a given Music Player is essentially limited by the number of Users that are assigned their own Remote Controls. According to the Bluetooth Protocol, the number of active Remote Controls simultaneously communicating with a given Music Player is limited to six (not including the seventh address, assigned to the Music Player). However, it is possible to "park" additional Remote Controls, parking and un-parking Remote Controls as needed to give up to 254 Remote Controls a turn to communicate.

Each Remote Control has its own globally unique 48-bit Bluetooth Device Address, and each User is assigned his/her own Remote Control and the assignment between the User and his/her Remote Control is known to the Service, so the Music Player is able to identify each User listening by the addresses of the Remote Controls currently communicating with the Music Player. As a direct result, the Music Player is able to tie each command sent by a given Remote Control to an individual User.

This ability to identify the currently-listening Users allows the software in the Music Player to create a mix of music according to the several tastes of all currently-listening Users. The process for creating this mix is similar to the single-User case: the Music Player software selects tracks from (a) the expressed favorite tracks of all Users currently listening, (b) tracks in the Music Player, including old favorites, that the Users have not heard from some time, (c) tracks that any of the Users heard and liked in other Music Players, and (d) tracks offered for sale from the Music Service.

The process for creating the mix in the playlist is not only inclusive—including the favorites of every User present—but is also exclusive: any Track that is "banned" by any User at any level, by track, by artist, by genre, is also dropped from the playlist.

There is also the possibility that some Users will label certain Tracks or Artists "private" (a system feature reserved for one's "guilty pleasures"). Private Tracks or Artists are excluded from automatically generated playlists when more than that one User is present.

FIG. 12: A User, at Another User's Music Player

A unique feature of the described implementation is that the Bluetooth Addresses of Remote Controls are globally unique, and not just unique to the Music Player. A User may (and should) carry his Remote Control with him, so that whenever the User—meaning his Remote Control—is in range of any Music Player, the Remote Control will connect to the Music Player, enabling the User to listen to and guide the mix played by that Music Player.

In the case when a Remote Control connects to a Music Player that is not its Home, and the User's Remote Control has never before connected to that Music Player, the Music Player must contact the Central Servers to identify the User who is assigned the Remote Control. When the Central Server responds with the identity of the User, it will also respond with the top favorite Tracks of that assigned User. If any of the Tracks are not present in the Music Player, the Music Player will then contact the Central Server and download the Music File and the describing metadata for each missing favorite Track, so they can be added into the "mix" of tracks played by that "foreign" Music Player.

When a Remote Control connects to a Music Player that is not its Home, and the User has been a "guest" of that Music Player before, the Music Player must still contact the Central Servers to identify the current top favorite Tracks of that User. If any of the Tracks are not present in the Music Player, the Music Player contacts the Central Server and downloads the Music File and the describing Metadata for each missing favorite Track, so they can be added into the "mix" of tracks played by that "foreign" Music Player.

Purchasing Music

FIG. 13 to FIG. 15: From Other Users

One key advantage of the portability of a User's music from Music Player to Music Player (outlined above), is that others listening to a given User's music may decide that they like it and would like to hear it at least one more time again, or even buy one or more Tracks. All any of the others need to do, whether they are at their Home Music Player or at another Music Player, is to click either the "Vote For" button or the "Buy" button on their Remote Control while the Track is playing.

Clicking either button will trigger a transaction from the Music Player to the Central Servers in which a copy of the Track and its related metadata is transmitted to the "buying" User's Home Music Player. If the Buyer's Home Music Player is powered on and connected to the Central Servers at that time, the track and metadata are downloaded onto that Music Player immediately and will be in his/her Music Player before he/she gets home. If the Buyer's Music Player is not online or is disconnected, the Track and metadata are queued in the central servers for downloading later, when the Buyer's Music Player comes online.

If the Buying User clicked the "Vote For" button and not the "Buy" button, the Track is downloaded to the Music Player, but is effectively offered on trial, with some limited number of free plays. If that limited number of free plays expires and the User has not clicked the "Buy" button to complete the purchase, the Track and its metadata will be deleted from the home Music Player.

On the other hand, if the Buying User actually clicked the "Buy" button, the Track becomes a part of his/her permanent collection, stored on his/her Music Player. The status of that Track as being owned by the Buying User will also be stored in the central servers. Any Track that is purchased is owned in common by all Users "homed" to the purchaser's Music Player.

Music Downloaded from Service Website

The central servers will also provide a website to subscribers of the Service. Among the services provided will be the ability to search through the catalog of all music stored on the system by all Users (not including any information on who owns what Track), allowing registered Users to identify Tracks to be downloaded to their own Music Player for purchase or for listening on a trial basis.

Tracks downloaded to the Music Player on trial are allowed a limited number of free plays. If that limited number of free plays expires and the User has not clicked the "Buy" button to complete the purchase, the Track and its metadata will be deleted from the home Music Player.

On the other hand, any Track that is purchased is owned in common by all Users "homed" to the purchaser's Music Player.

Music Offered from Network/Service

Over time, as data is collected in the central servers, patterns of use will emerge that make it possible to identify Tracks from the catalog in the central servers that Users might like to have in their collection. It will be possible not only for the service to "push" such Tracks to the Music Players of appropriate Users, but also for music distributors to use this service as a means of initial promotion and distribution.

As with other Tracks downloaded to the Music Player on a trial basis, these are allowed a limited number of free plays; in this case, the number of free plays will be set by the service and/or the distributor of the music. When that limited number of free plays expires, if the User has not clicked the "Buy" button to complete the purchase, the Track and its metadata will be deleted from the home Music Player.

Once a Track is purchased, it is owned in common by all Users "homed" to the purchaser's home Music Player.

FIG. 16: Selling Music

A key aspect of the embodied System is that each User is assigned his/her own uniquely-identified Remote Control, enabling the Music Player and the service to identify all users listening at each Music Player. This application also describes how Users are able to buy Tracks using their Remote Control. At the same time, the service maintains information on which User(s) previously owned a Track being purchased. With this information, the service may share some credit for the sale to the previous Track Owner, as a promoter of both the Track and the Service.

1. When a User attempts to purchase a Track by pressing the "Buy" button on his/her Remote Control, the service will first make sure that the User does not own that Track already. If the User already owns that Track, the "Buy" press will be of no effect.
2. If the User does not own the Track, the service checks to see whether the Track was pushed to the Music Player directly by the service. In that case, only the service gets credit for the sale, leading to a two-way split of revenue for the sale, between the service and the distributor (by whom the artist is paid).
3. On the other hand, the Track that the User is choosing to purchase may be a Track that the User voted for at another Music Player that they were visiting, a Track that was previously owned by another User of that visited Music Player. This case is somewhat more complicated and will cause a three-way sales credit split between the distributor and the service and the previously-owning User. Depending on future negotiations, the Inventor anticipates that the distributor's part of the split shall be fixed for both the two-way and the three-way case; the portion of the sales credit going to the previously-owning User will come out of the portion of the sales credit that would go to the service embodied in the Invention.

The invention claimed is:

1. A method for providing an integrated network-based system for automated selecting, sequencing, playing, storage, distribution, and management of electronic media, including but not limited to music tracks, for one or more users, comprising:

assigning to a subscribing user a music playing device and a remote control device wherein both of said devices are assigned to a home location of the subscribing user;

assigning to a different subscribing user a different music playing device and a different remote control device wherein both of said devices are assigned to a home location of the different subscribing user;

providing a central server within the integrated system, wherein the central site stores records of all the assignments of the music playing devices and remote control devices to subscribing users, stores backup copies of electronic media owned by all subscribing users, and stores records of ownership, popularity, and frequency of play of the electronic media;

connecting the remote control device to the different music playing device and determining, using a computer processor, that home location of the remote control device is different than the home location of the different music playing device;

in response to the determination, transmitting a list of top favorite tracks for the subscribing user from the central server to the different music playing device;

determining that at least one music file for a track in the top favorite tracks is missing from the different music playing device and causing a download of the at least one music file to the different music playing device;

inserting at least a portion of the top favorite tracks into a mix of tracks of the different music playing device;

receiving a vote request from the different subscribing user for at least one of the top favorite tracks in the portion of the top favorite tracks which causes the initiation of a free trial of the at least one of the top favorite tracks, wherein the free trial provides a limited number of free plays of the at least one top favorite track.

2. The method of claim 1, wherein each remote control device is configured with its own unique device address.

3. The method of claim 1, further comprising receiving a purchase request from the subscribing user for a track played on the different music playing device while the different music playing device is playing the track.

4. The method of claim 3, further comprising automatically transmitting the purchased track to the music playing device of the subscribing user.

5. The method of claim 3, further comprising awarding a credit to the different subscribing user upon detecting the purchase request by the subscribing user.

6. The method of claim 2, wherein upon establishment of a connection between the uniquely-addressed remote control device and the different music playing device, permission is granted for access to all stored personal electronic media of the subscribing user and different subscribing user on the different music playing device.

7. The method of claim 1, further comprising automatically adjusting a music playing sequence according to preferences of any number of subscribing users.

* * * * *